United States Patent
Knapke et al.

(10) Patent No.: US 11,885,408 B2
(45) Date of Patent: *Jan. 30, 2024

(54) VEHICLE DRIVETRAIN WITH INTERAXLE DIFFERENTIAL AND METHOD FOR DRIVETRAIN OPERATION

(71) Applicant: Dana Heavy Vehicle Systems Group, LLC, Maumee, OH (US)

(72) Inventors: Brian V. Knapke, Maumee, OH (US); Patrick F. Rose, Hilliard, OH (US); Atul Jagannath Patil, Pune (IN)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/823,467

(22) Filed: Aug. 30, 2022

(65) Prior Publication Data

US 2022/0412451 A1 Dec. 29, 2022

Related U.S. Application Data

(63) Continuation of application No. 17/184,476, filed on Feb. 24, 2021, now Pat. No. 11,473,670.

(Continued)

(51) Int. Cl.
| | |
|---|---|
| *F16H 48/34* | (2012.01) |
| *F16H 57/04* | (2010.01) |
| *F16C 19/54* | (2006.01) |
| *F16C 33/66* | (2006.01) |
| *F16H 48/08* | (2006.01) |
| *B60K 23/08* | (2006.01) |

(Continued)

(52) U.S. Cl.
CPC ..... *F16H 57/0483* (2013.01); *B60K 23/0808* (2013.01); *F16C 19/548* (2013.01); *F16C 33/6659* (2013.01); *F16H 48/08* (2013.01); *F16H 48/22* (2013.01); *F16H 48/34* (2013.01); *F16H 57/0424* (2013.01); *F16H 57/0457* (2013.01); *F16H 57/0471* (2013.01); *B60K 2023/046* (2013.01); *F16H 2700/02* (2013.01)

(58) Field of Classification Search
CPC .......... B60K 23/0808; B60K 2023/046; B60K 23/04; B60K 17/346; F16H 48/08; F16H 48/22; F16H 48/34
See application file for complete search history.

(56) References Cited

U.S. PATENT DOCUMENTS

| | | |
|---|---|---|
| 5,910,061 A | 6/1999 | Organek et al. |
| 5,947,857 A | 9/1999 | Organek et al. |

(Continued)

FOREIGN PATENT DOCUMENTS

DE 102015008790 A1 * 1/2016 ............ F16D 27/115

*Primary Examiner* — Sherry L Estremsky
(74) *Attorney, Agent, or Firm* — McCoy Russell LLP

(57) ABSTRACT

Drivetrain systems and methods are provided. In one example, the drivetrain system includes an interaxle differential (IAD) configured to receive power from a prime mover, a motor configured to drive a planetary gearset, and a ball ramp actuator configured to selectively engage a plurality of plates in a clutch pack of a friction clutch in response to receiving rotational input from the planetary gearset. In an engaged configuration, the friction clutch prevents speed differentiation between a first IAD output and a second IAD output.

18 Claims, 9 Drawing Sheets

Related U.S. Application Data

(60) Provisional application No. 62/981,917, filed on Feb. 26, 2020.

(51) Int. Cl.
*F16H 48/22* (2006.01)
*B60K 23/04* (2006.01)

(56) References Cited

U.S. PATENT DOCUMENTS

| | | |
|---|---|---|
| 6,561,939 B1 | 5/2003 | Knapke |
| 6,645,109 B2 | 11/2003 | Williams et al. |
| 6,758,782 B2 | 7/2004 | Mätzschker et al. |
| 6,766,889 B1 | 7/2004 | Pennycuff |
| 7,527,133 B2 | 5/2009 | Sachsenmaier et al. |
| 9,816,603 B2 | 11/2017 | Hayes et al. |
| 11,098,793 B1 | 8/2021 | Knapke et al. |
| 11,473,670 B2 * | 10/2022 | Knapke ............... F16H 57/0473 |

* cited by examiner

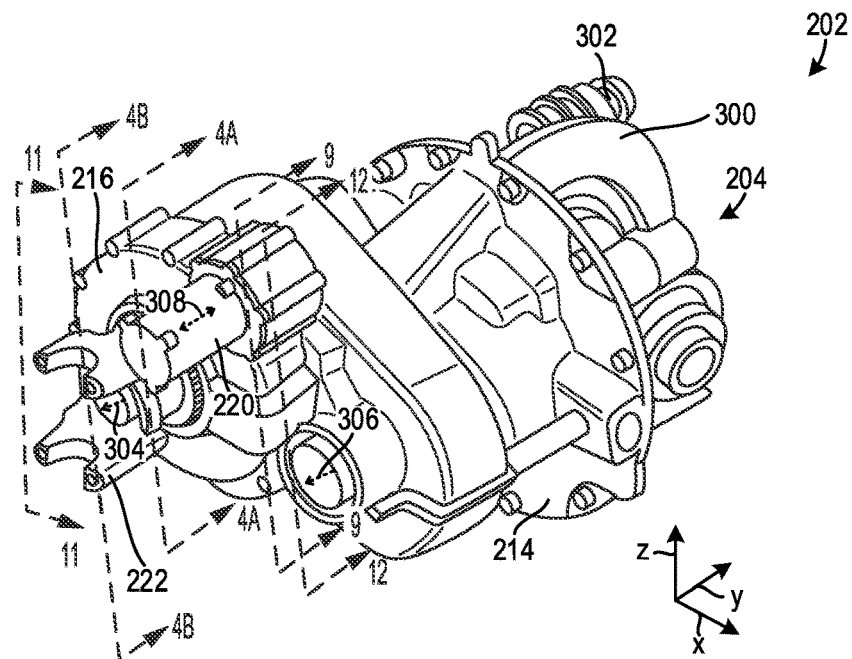
FIG. 3
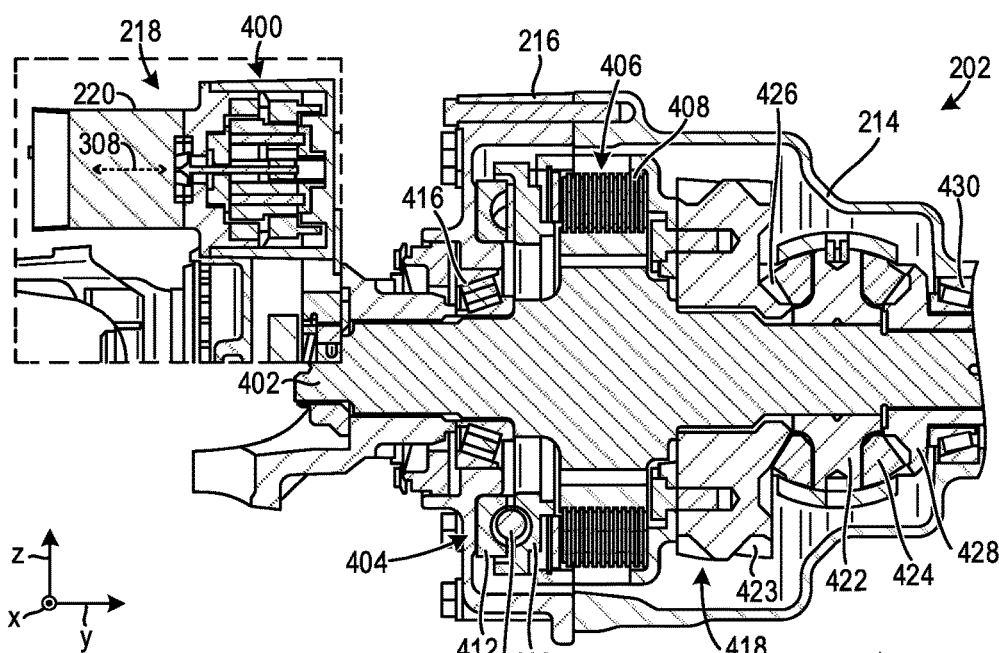

US 11,885,408 B2

VEHICLE DRIVETRAIN WITH INTERAXLE DIFFERENTIAL AND METHOD FOR DRIVETRAIN OPERATION

CROSS-REFERENCE TO RELATED APPLICATIONS

The present application is a continuation of U.S. patent application Ser. No. 17/184,476 entitled "VEHICLE DRIVETRAIN WITH INTERAXLE DIFFERENTIAL AND METHOD FOR DRIVETRAIN OPERATION", and filed Feb. 24, 2021. U.S. patent application Ser. No. 17/184,476 claims priority to U.S. Provisional Application No. 62/981,917, entitled "VEHICLE TRANSMISSION COMPONENT, SYSTEM, AND METHOD", and filed on Feb. 26, 2020. The entire contents of the above-listed applications are hereby incorporated by reference in their entirety for all purposes.

BACKGROUND AND SUMMARY

Vehicle drivetrains under certain conditions may experience drive axle slip in tandem axles, which may adversely impact vehicle handling. To prevent slip, some interaxle differentials (IADs) have included dog clutches that lock the differential to increase traction, under some conditions. Constraints may be placed on the IAD locking device which limit the window in which IAD locking and unlocking functionality can occur.

IADs may further include lubrication systems to reduce component wear and increase IAD longevity. U.S. Pat. No. 9,816,603 B2 to Hayes et al. teaches an IAD lubrication system which routes lubricant to bearings coupled to an input shaft. The lubricant is routed via passages integrated into various shafts in the IAD. The IAD system further includes a lock collar with sets of teeth that engage and disengage to lock and unlock the IAD.

The inventors have recognized drawbacks with the IAD system taught by Hayes as well as other IAD systems with locking capabilities. For instance, the IAD locker, embodied as a dog clutch, may be susceptible to wear and improper engagement, under certain conditions. The lubrication system taught by Hayes may not provide targeted amounts of lubricant to certain high wear areas of the differential. Furthermore, the complex routing of Hayes' lubricant passages may increase flow losses and the likelihood of system degradation. This lubrication system complexity may pose further impediments to achieving lubrication goals. Further, previous IAD locking systems may experience relatively high torque spike during certain periods of operation that have the potential to cause component degradation.

Facing these challenges, the inventors developed a drivetrain system to at least partially cope with at least a portion of the challenges. The drivetrain system, in one example, includes an IAD designed to receive power from a prime mover. The system further includes a motor configured to drive a planetary gearset. Still further the system includes a ball ramp actuator that selectively engages a plurality of plates in a clutch pack of a friction clutch. The clutch plates are transitioned into engagement in response to receiving rotational input from the planetary gearset. While the friction clutch remains engaged, the clutch prevents speed differentiation between a first axle differential and a second axle differential. The planetary gearset therefore functions as a compact torque multiplier for clutch actuation. Consequently, the torque needed to lock of the IAD is space efficiently achieved. Using a space efficient clutch actuator poses less space constraints on surrounding vehicle systems. Further, the use of a friction clutch allows the window of IAD locking functionality to be expanded. For instance, an active IAD locking strategy may be deployed in which locking operation is automatically initiated taking into account system and/or vehicle operating conditions.

In one example, the planetary gearset is non-backdrivable. This planetary configuration allows motor energization to be discontinued once the torque demanded to lock the clutch has been achieved. In this way, the actuation assembly's efficiency may be increased, in comparison to actuator arrangements that are backdrivable and thus demand motor energization to sustain clutch locking. For instance, the system may include a controller that, in a first stage, automatically energizes the motor to lock the clutch. In a second stage, the controller de-energizes the motor after the clutch is locked. Consequently, motor energization may be strategically used to lock the IAD and then subsequently discontinued to conserve electrical energy, while the IAD remains locked.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 3 shows a detailed view of the IAD, depicted in FIG. 2.

FIGS. 4A and 4B show cross-sectional views of the IAD, depicted in FIG. 3.

DETAILED DESCRIPTION

Vehicle drivetrain and control method embodiments are described herein. The drivetrain includes an interaxle differential (IAD) that may be designed with active locking functionality. The active locking control strategy allows the window of locking functionality to be expanded. The IAD includes, in one example, a friction clutch actuated by an electric motor to lock and unlock the IAD. A planetary gearset is used in the clutch's actuation assembly as an efficient torque multiplier for engaging and disengaging the friction clutch. The planetary gearset allows the torque generated by the motor during clutch actuation to be reduced. Consequently, the clutch may be more efficiently actuated and the system's size and complexity may be reduced. In one example, the planetary assembly may be non-backdrivable. The non-backdrivable planetary gearset allows the gears to hold the load from the friction clutch during clutch engagement. In turn, motor hold torque may not be demanded during clutch locking operation, thereby increasing the clutch's operational efficiency.

The IAD system may further include a lubrication system that efficiently routes lubricant through a supply lubricant passage in the IAD housing. Specifically, the lubricant passage supplies lubricant to a gear coupled to the friction clutch and/or an input bearing in the IAD and the clutch plates. The supply passage may receive lubricant from splash lubricant generated by an input gear in an axle differential. In this way, the lubricant flow through the passage may be gathered from an existing lubrication mechanism. Consequently, the components supplied with lubricant by the lubrication system may be expanded without unduly increasing the system's complexity and/or system losses, for instance.

Figure 1:
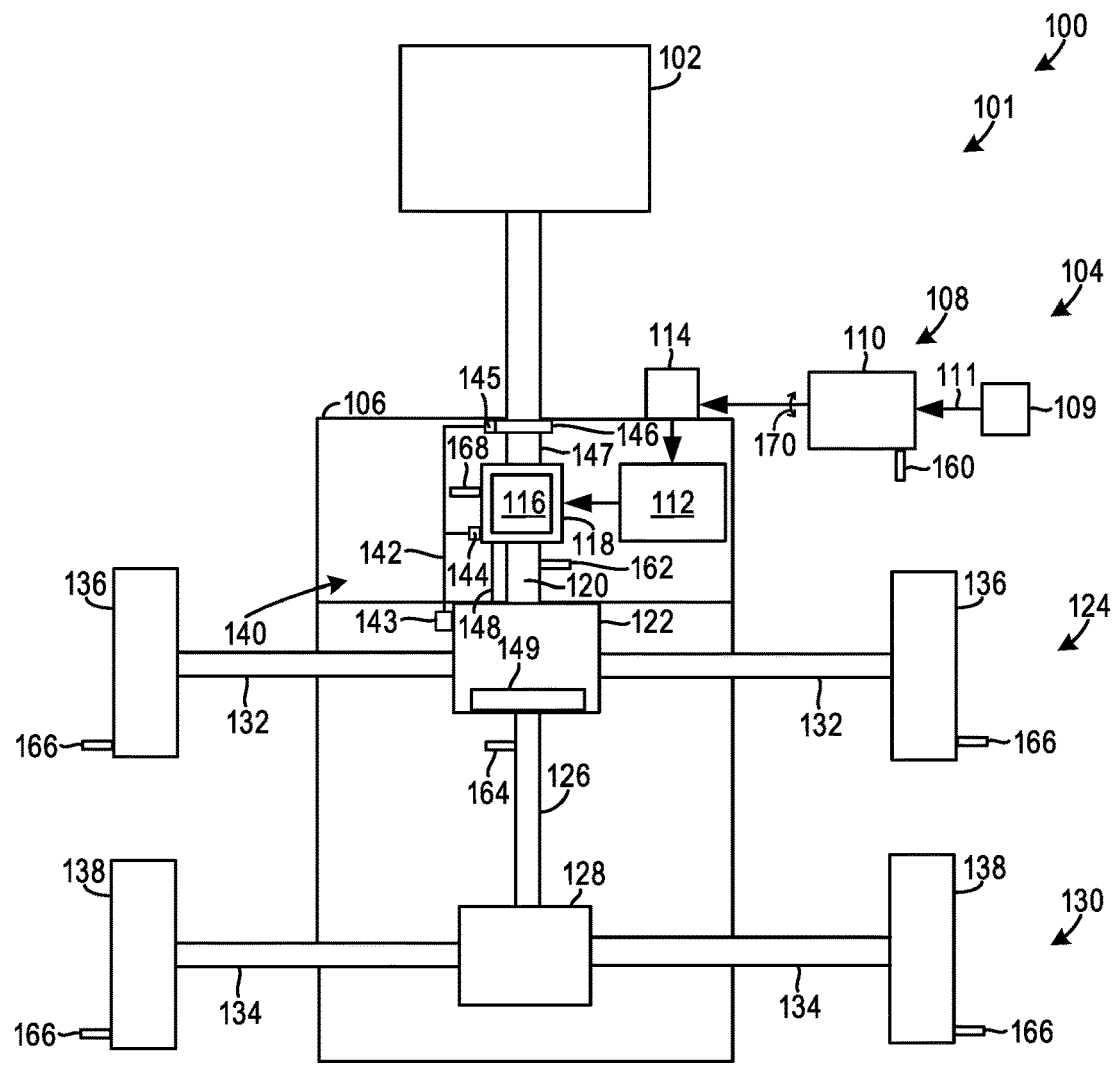
FIG. 1 shows a schematic diagram of a vehicle with an interaxle differential (IAD).
Figure 2:
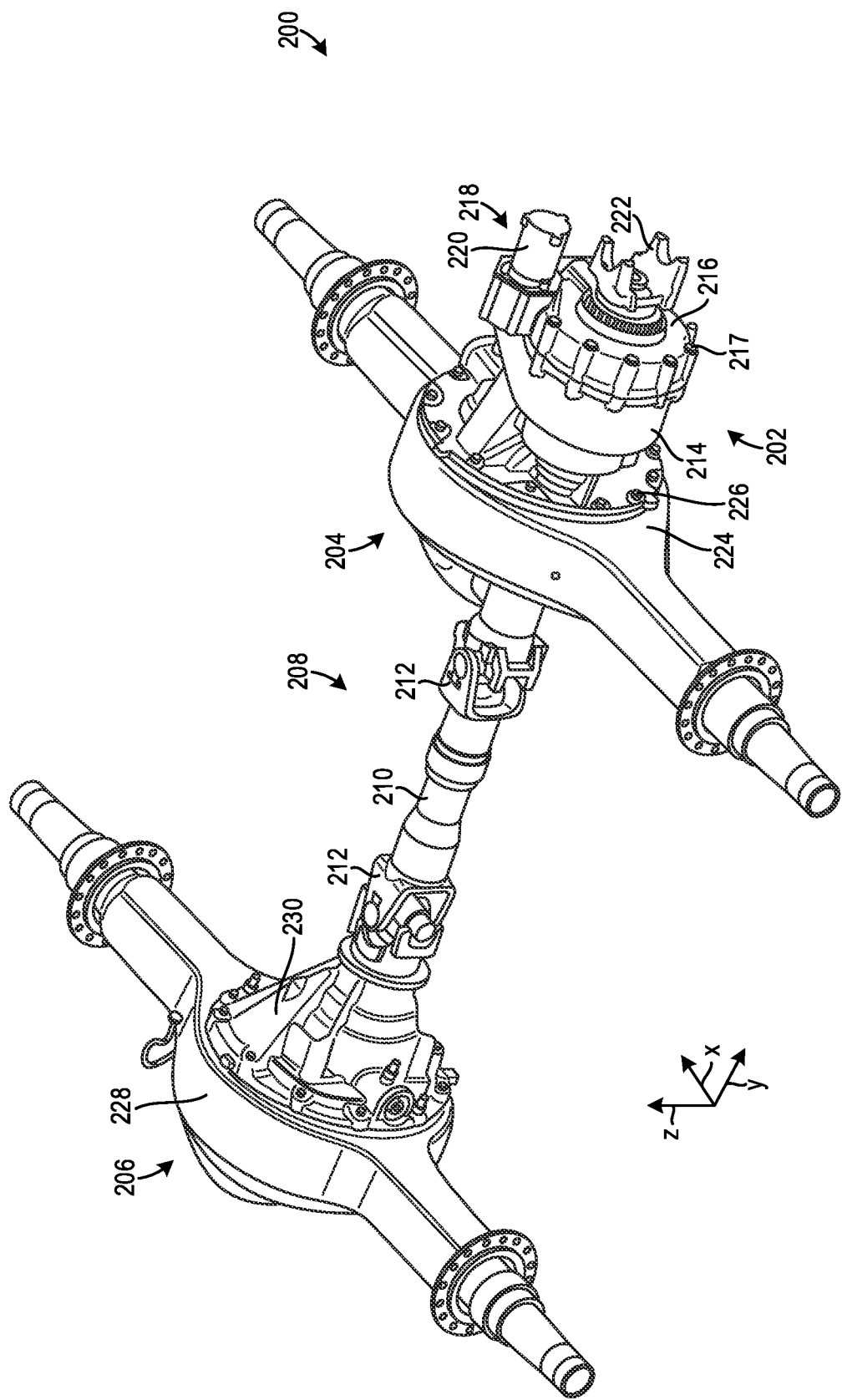
FIG. 2 shows a perspective view of an example of a drivetrain system with an IAD.
Figure 5:
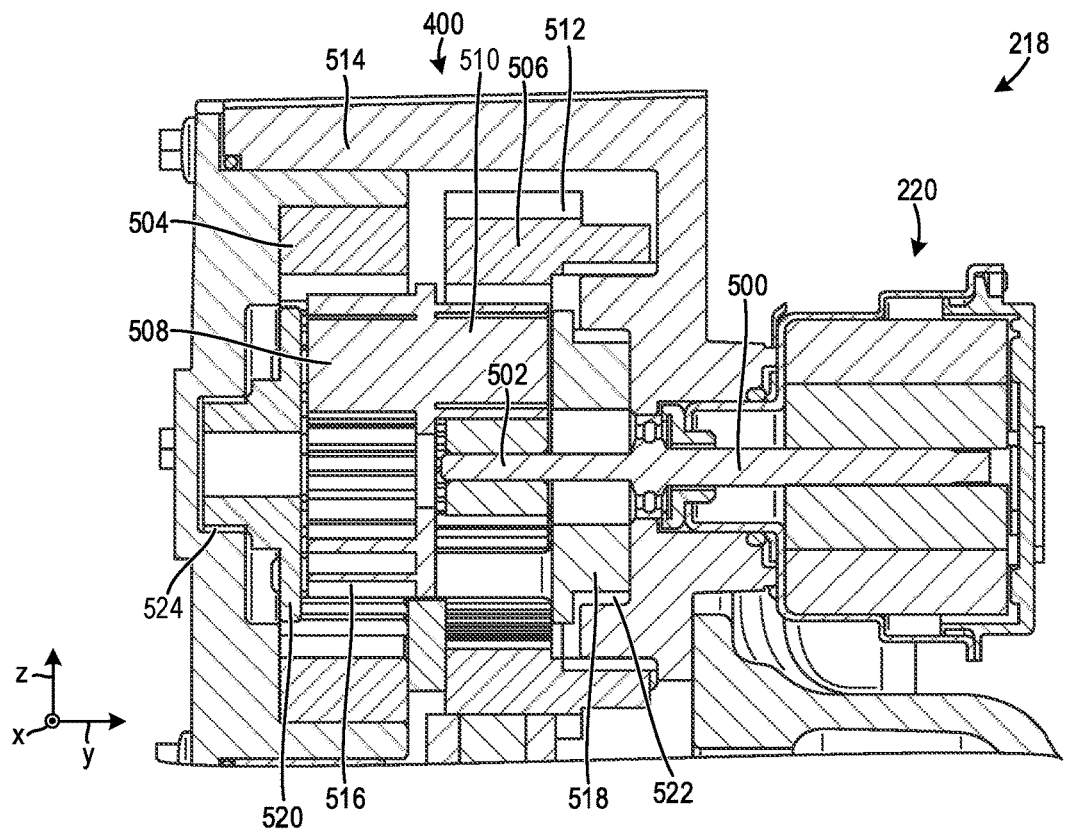
FIGS. 5 and 6 show different cross-sectional views of an actuation assembly, in the IAD depicted in FIG. 2.
Figure 6:
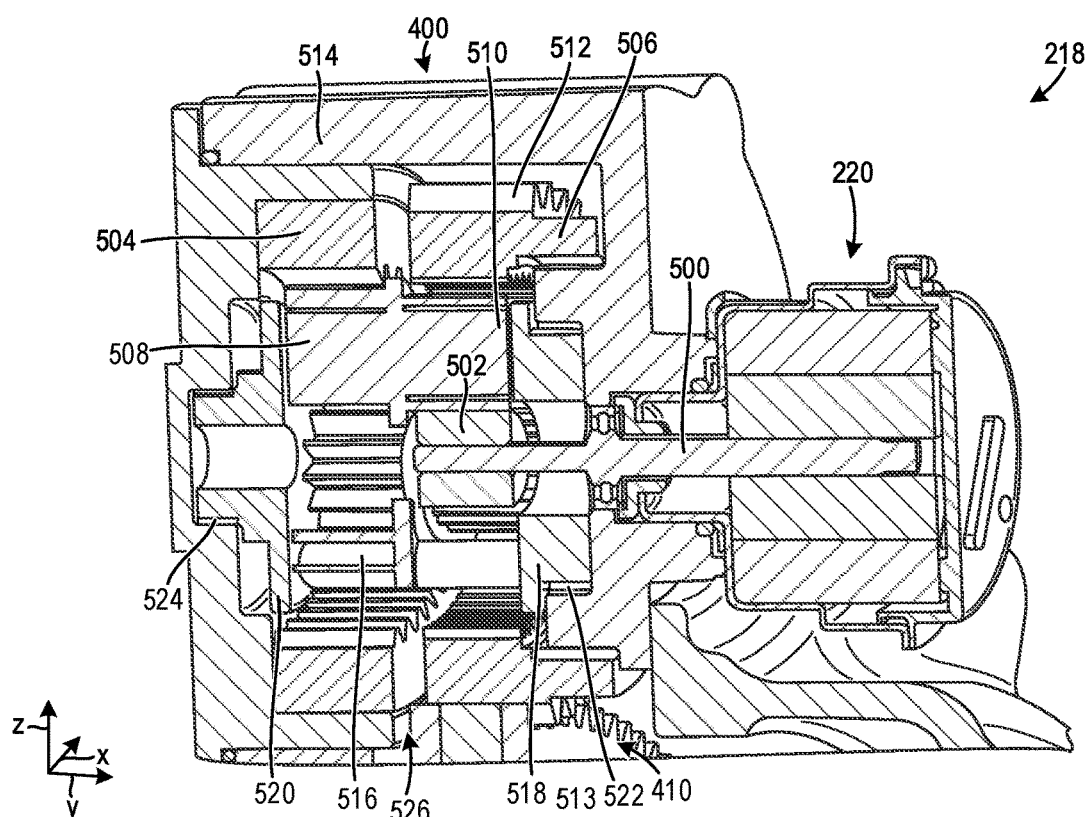
Figure 7:
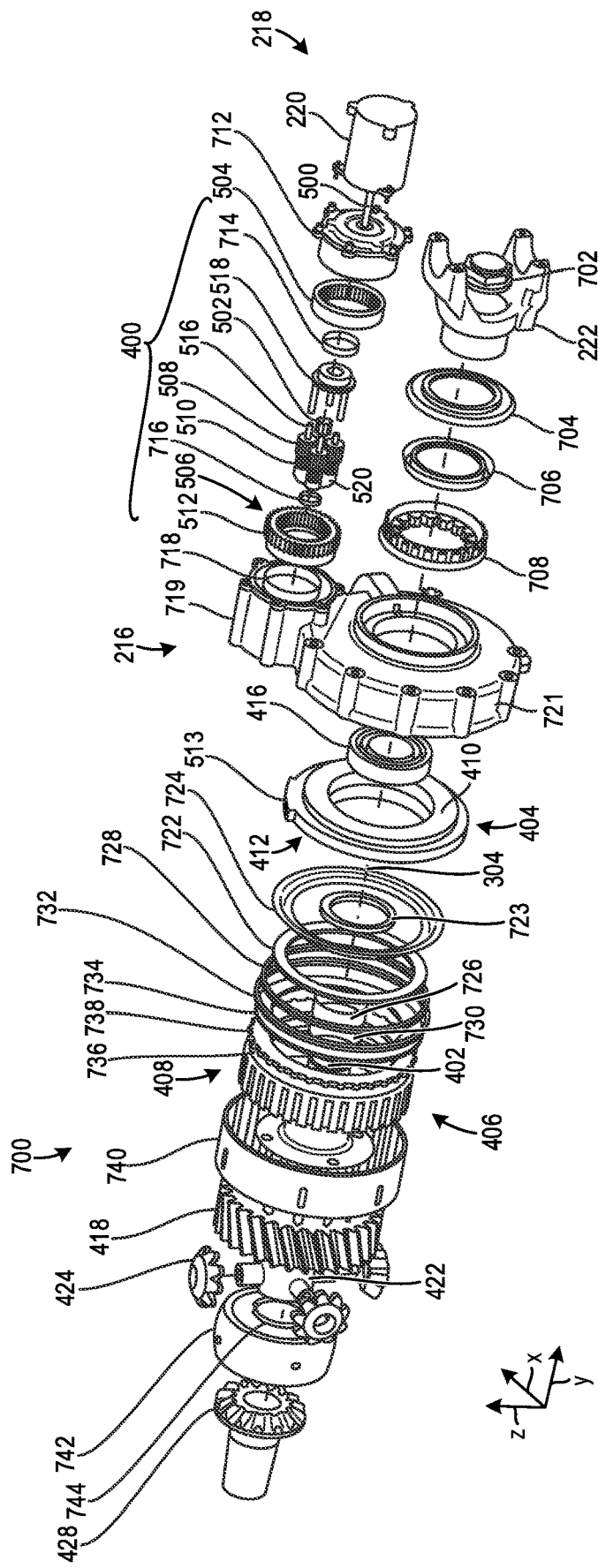
FIG. 7 shows an exploded view of the actuation assembly, friction clutch, and associated gearing in the IAD, depicted in FIG. 2.
Figure 8:
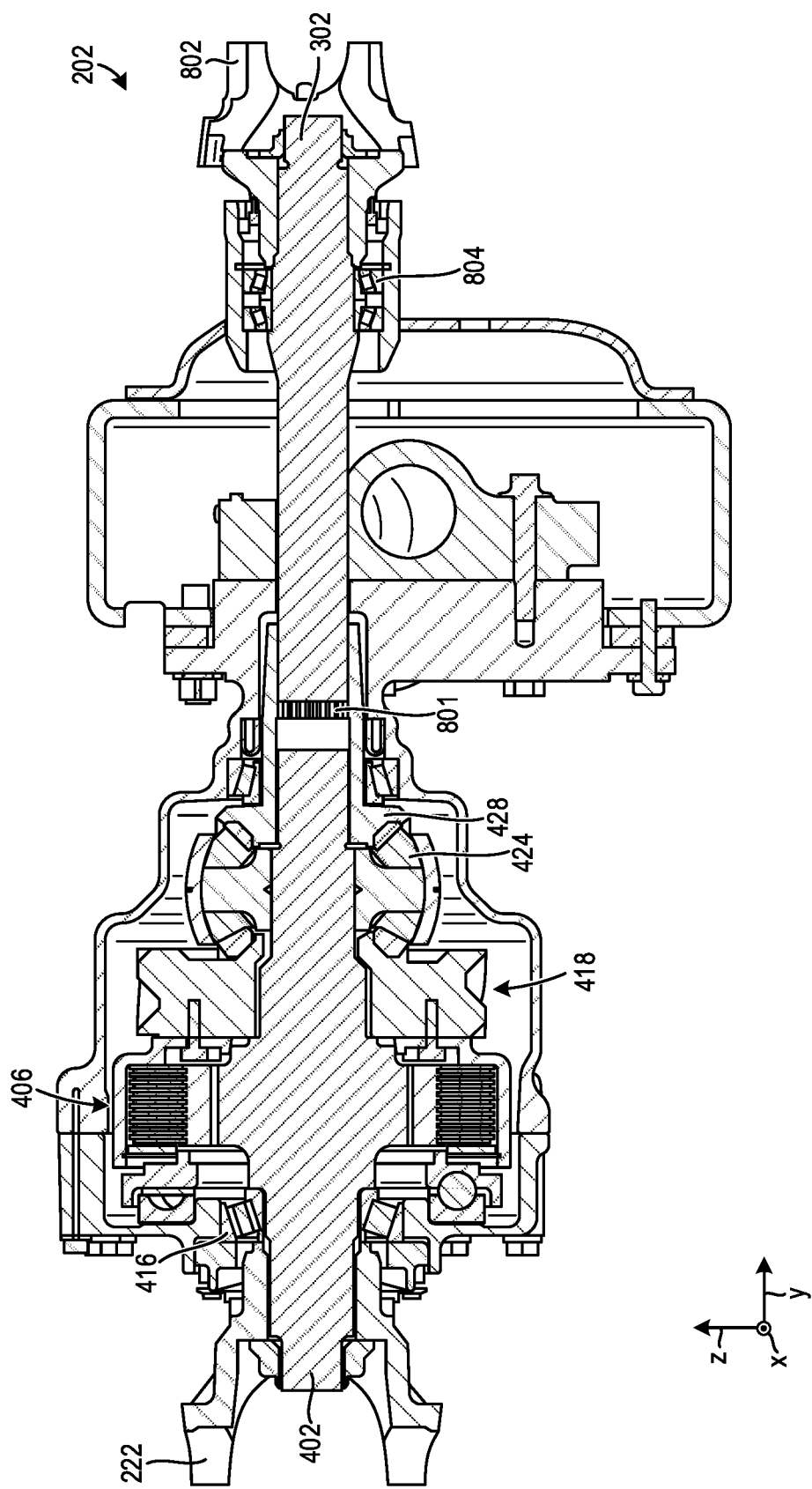
FIG. 8 shows a cross-sectional view of the friction clutch, shafts, and associated gears in the IAD, depicted in FIG. 2.
Figure 13:
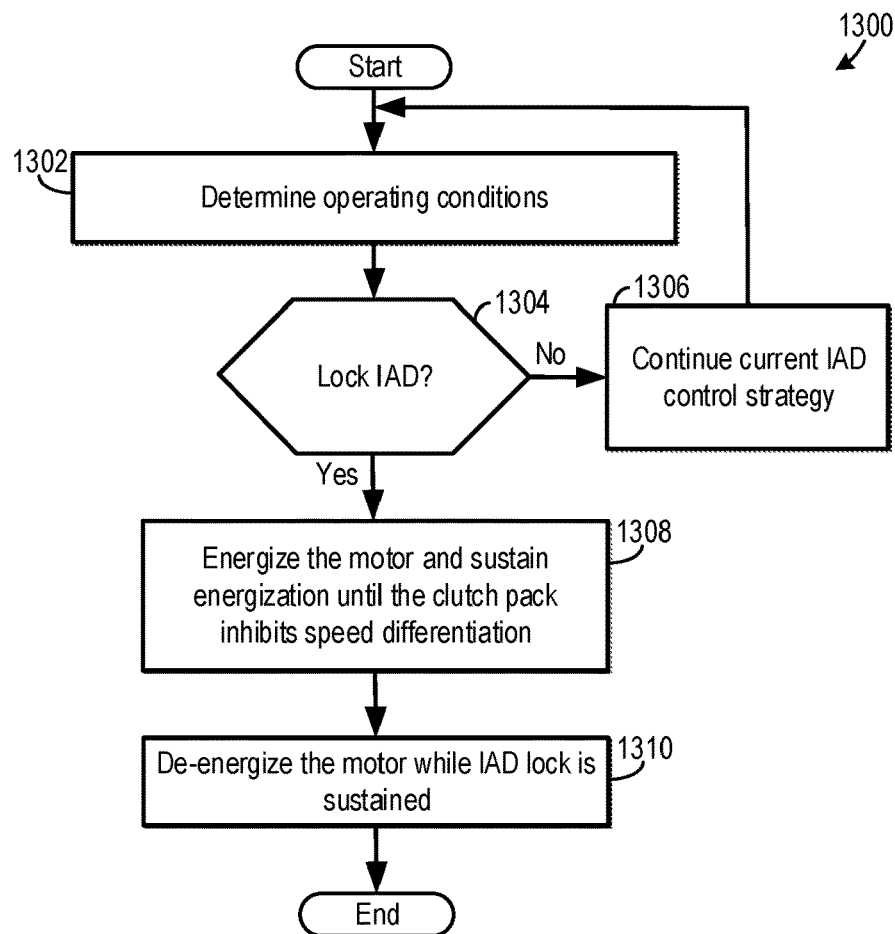
FIG. 13 shows a method for operation of an IAD.
Figure 14:
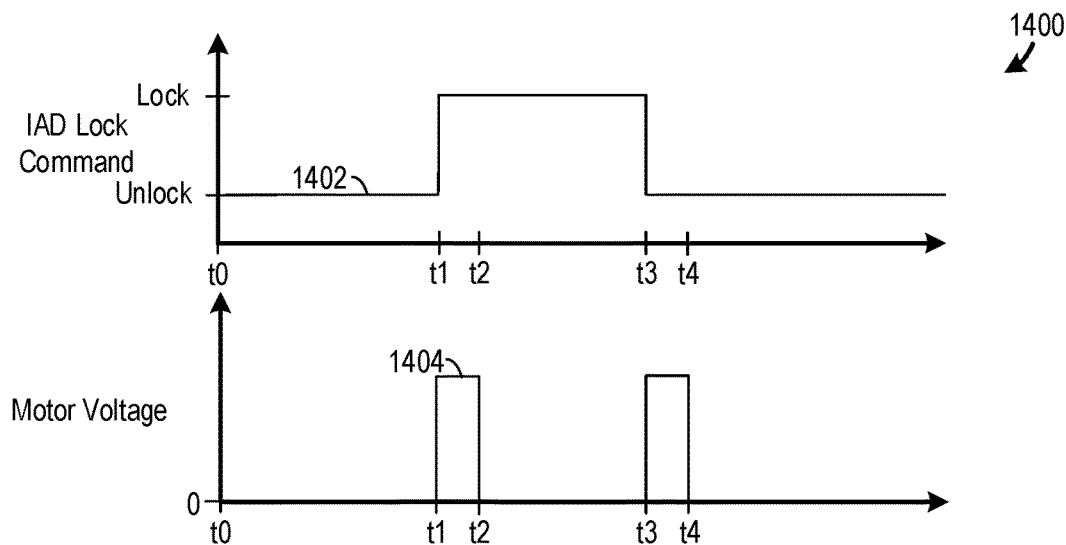
FIG. 14 shows a timing diagram of a use-case IAD control strategy.

FIG. 1 shows a schematic depiction of a vehicle with an IAD designed for efficient locking and unlocking operation. FIGS. 2 and 3 show an example of a vehicle drivetrain with an IAD with an actuation assembly with a planetary gearset that allows the IAD's locking mechanism to be locked an unlocked in a space efficient package. FIGS. 3 and 8 show cross-sectional views of the locking mechanism and actuation assembly in the IAD. FIGS. 5-6 show a detailed view of the planetary gearset in the IAD. FIG. 7 shows an exploded view of the IAD's actuation assembly and friction clutch. FIGS. 9-12 show a lubrication system in the IAD that passively routes lubricant to the locking clutch and actuation assembly via a splash lubrication arrangement in an axle differential. FIG. 13 shows a method for automatically locking an IAD based vehicle operating conditions. FIG. 14 depicts a use-case timing diagram for a clutch locking sequence in which the motor is initially energized and then de-energized once the clutch reaches engagement.

FIG. 1 shows a schematic diagram of a vehicle 100 that may comprise a prime mover 102 (e.g., an internal combustion engine, an electric motor, combinations thereof, and the like). Thus, in one example, the vehicle may be a hybrid vehicle which may increase fuel efficiency but add complexity to the vehicle. Alternatively, the vehicle may include solely an internal combustion engine which may reduce vehicle complexity at the expense of fuel economy, for instance. The vehicle may be a light, medium, or heavy duty type vehicle that may be designed for on-road and/or off-road travel. The prime mover 102 provides power to a drivetrain 101 that includes a system 104 with an IAD 106. It will be appreciated that the drivetrain may include a transmission.

As described in more detail herein, the IAD 106 may include an actuation assembly 108. The actuation assembly 108 may comprise an electric motor 110 which drives a ball ramp actuator 112 via a planetary gearset 114. In turn, the ball ramp actuator 112 engages and disengages sets of plates in a clutch pack 116 of a friction clutch 118. The electric motor 110 may include a rotor electromagnetically interacting with a stator to rotate an output shaft in opposing rotational directions. The ball ramp actuator 112 may include ramped plates with balls positioned therebetween. The interaction between the ramps and balls allows the actuator to axial extend and retract an actuation plate, for example. An energy source 109 (e.g., battery, capacitor, alternator, combinations thereof, etc.) may provide electrical energy to the motor 110 for energization. The transfer of energy from the energy source 109 to the motor 110 is indicated via arrow 111.

The planetary gearset 114 may include a sun gear, planet gears on a carrier, ring gears, etc. The planetary gearset functions as a compact torque multiplier between the motor and the actuator of the friction clutch. In this way, the size as well as the electrical energy consumed by the motor to actuate the clutch may be decreased. System efficiency may be consequently increased. Further, the planetary gearset 114 may be non-backdrivable, such that the clutch can remain engaged and disengaged without motor hold torque. Thus, the planetary gearset may hold the load from the friction clutch during clutch engagement. In this way, the motor's energy efficiency may be increased in comparison to systems that stall the motor to generate clutch hold torque. Designing the planetary assembly with non-backdrivable functionality may further decrease the chance of motor degradation cause by torque spike events. Specific exemplary arrangements of the gears in the planetary assembly are described in greater detail herein. Exemplary as described herein does not give any sort of preferential indication but rather signifies one among multiple potential configurations.

The IAD 106 includes a first output 120 (e.g., an output shaft and/or other suitable mechanical attachment that provides power to a first axle differential 122 in a first drive axle 124). The IAD 106 further includes a second output 126 (e.g., a shaft and/or other suitable mechanical attachment that provides power to a second axle differential 128 in a second drive axle 130). To elaborate, the first and second drive axles 124, 130 may be included in a tandem drive axle arrangement, in one example. Therefore, in such an example, the tandem drive axle arrangement may not be steerable and may be positioned rearward of a steerable axle which may be a non-drive axle, in some instances. However, in alternate examples, the vehicle may further include a drive axle which is steerable. The first and second drive axles 123, 130 include axle shafts 132, 134, (e.g., half shafts) respectively, which are rotationally coupled to drive wheels 136, 138. In this way, the power path through the drivetrain may be routed to drive wheels.

Due to the schematic illustration in FIG. 1, certain structural details may be shown at a high level. However, the IAD may have additional structural features that are depicted in greater detail with regard to FIGS. 2-12. For instance, the IAD housing may be directly attached to a housing of the first axle differential.

The first and second axle differentials 122, 128 may be configured to permit speed differentiation between the corresponding axle shafts (e.g., axle half shafts). To achieve this functionality, the differentials may include an input gear, a case, spider gears, side gears, and the like, in one example. Other types of differentials such as epicycle differentials, have been contemplated. Further in some examples, at least one of the axle differentials may include locking functionality. The axle differential locker(s) may be electronic or hydraulic type locking device(s), for instance. Alternatively, in another example, the axle differential lockers may be omitted from the drivetrain due to the increased traction provided by the IAD locking device. Consequently, system complexity and cost may be reduced.

The system 104 may further include a lubrication assembly 140. The working fluid in the lubrication system may be a suitable lubricant such as natural and/or synthetic oil. The lubrication assembly 140 includes a supply lubricant passage 142. The supply lubricant passage 142 may include an inlet 143 that may receive lubricant (e.g., splash lubricant) from a gear (e.g., bevel gear) in the first axle differential 122. The supply lubricant passage 142 may include a first outlet 144 and a second outlet 145. The first outlet 144 may supply lubricant to a gear coupled to the friction clutch 118. Further, the second outlet 145 may supply lubricant to a bearing 146 (e.g., input bearing) coupled to an input shaft 147. The shaft may extend from an input interface such as a yoke which receives power from the prime mover. The lubrication assembly 140 may further include a return passage 148 which routes lubricant back to a sump 149 in the first axle differential 122.

A control system 150 with a controller 152 may be incorporated in the vehicle 100. The controller 152 includes a processor 154 and memory 156. The memory 156 may hold instructions stored therein that when executed by the processor cause the controller 152 to perform the various methods, control strategies, lubrication techniques, etc., described herein. The processor 154 may include a microprocessor unit and/or other types of circuits. The memory 156 may include known data storage mediums such as random access memory, read only memory, keep alive memory, combinations thereof, etc. Further, the memory 156 may include non-transitory memory.

The controller 152 may receive vehicle data and various signals from sensors positioned in different locations in the vehicle 100 and the drivetrain system 104, indicated at 158. The sensors may include a motor position sensor 160, shaft speed sensors 162, 164, wheel speed sensors 166, clutch position sensor 168, etc. The controller 152 may send control signals to controllable components, indicated at 169. The controllable components may include the motor 110. For instance, the controller 152 may send signals to the motor 110 to adjust the rotational speed, torque, and/or direction of motor rotation, indicated via arrows 170. The controller 152 may send signals to other controllable components, such as the axle differentials 122, 128, the prime mover 102, etc. Alternatively, the controller may solely control components in the drivetrain such as the actuation assembly (e.g., the electric motor). Additionally or alternatively, a vehicle electronic control unit (ECU) may be provided in the vehicle to control other adjustable components such as the prime mover (e.g., engine). It will be appreciated that the motor may be controlled to lock and unlock the IAD. The control system 150 and specifically the controller 152 with the memory 156 and processor 154 may therefore be configured to carry out the control techniques elaborated upon herein with regard to FIGS. 13-14, for instance.

The vehicle 100 may include an input device 172 (e.g., a button, a switch, a touch panel, a touch interface, and the like). The input device 172, responsive to driver input, may generate a mode request that indicates a desired state (e.g., locked or unlocked state) of the IAD. Additionally or alternatively, IAD locking may be initiated programmatically taking into account vehicle operating conditions such as wheel speed, wheel slip, and/or ambient temperature. The input device may be located in a vehicle cabin (e.g., vehicle dash), in some cases. However, in other examples, the input device may be omitted from the vehicle and the controller may provide an automatic and active IAD locking control strategy.

An axis system is shown in FIG. 1 as well as FIGS. 2-12 to establish a common frame of reference. In one example, the z-axis may be parallel to a gravitational axis, the x-axis may be a lateral axis, and the y-axis may be a longitudinal axis. However, other orientations of the axes may be used, in other examples.

FIG. 2 shows a perspective view of an example of a drivetrain system 200. The system 200 illustrated in FIG. 2 may be an example of the system 104 depicted in FIG. 1. As such, the systems may share common structural and/or functional features. The drivetrain system 200 includes an IAD 202 and may further include a first axle differential 204 and a second axle differential 206. The axle differentials may form a portion of drive axles that comprise axle shafts rotationally coupled to drive wheels. Further, in one example, the axles may be beam axles in which the wheels are connected via a continuous structure (e.g., beam, shaft, and the like). A mechanical assembly 208 with shafts 210, joints 212, and/or other suitable mechanical components may deliver power from the IAD 202 to the second axle differential 206. The joints 212 enable articulation between the drive axles and may be U-type joints. However, other types of joints for transferring rotational energy between the drive axles, have been contemplated.

The IAD 202 may include a housing section 214 that at least partially encloses shafts, gears, and the like that facilitate the power transfer and the speed differentiation between the speed of the shafts coupled to the first and second axle differentials. The IAD may further include a housing section 216 that at least partially encloses an actuation assembly 218 and/or a clutch. The housing sections 214, 216 may be removably coupled via attachment devices 217 (e.g., bolts). However, other attachment techniques such as welding have been contemplated. As previously discussed, the clutch is designed to inhibit and allow speed differentiation between two drive axles. In this way, vehicle traction may be increased during selected conditions to enhance vehicle handling. Bolts or other suitable attachment devices may be used to removably attach the housing sections to one another.

The actuation assembly 218 includes an electric motor 220. An input yoke 222 or other suitable mechanical component may be provided in the IAD to serve as an interface with an engine, electric motor, or other suitable prime mover. The housing section 214 is removably attached to a housing 224 of the first axle differential 204. Specifically, bolts 226 and/or other suitable mechanical attachment devices may extend through flanges in the housing section 214 and the housing 224 to facilitate the removable mechanical attachment. In this way, the axle differential may be compactly incorporated into the drivetrain, although less space efficient arrangements have been envisioned.

Housing sections 228, 230 of the second axle differential 206 are further depicted in FIG. 2. The housing of both the first and second differential may have a banjo shape. However, alternative differential housing layouts may be used, in other examples.

FIG. 3 shows a detailed view of the IAD 202. The input yoke 222, electric motor 220, housing section 214, and housing section 216 are again shown. A gear 300 (e.g., an input gear such as a ring gear or a bevel gear) of the first axle differential 204 is shown along with an output shaft 302 that may be rotationally coupled to the second axle differential 206 by, for example, the shafts and joints, depicted in FIG. 2.

The electric motor 220 may be arranged above the input yoke 222 and may extend axially away from the housing section 216. Other motor arrangements have been contemplated which may be determined based on packaging constraints imposed by other vehicle components such as the frame, motive power source (e.g., engine and/or drive motor), and the like. The motor 220 may further be laterally positioned between an input shaft and a side shaft in the IAD 202, in one example. A rotational axis 304 of the input shaft, a rotational axis 306 of the side shaft, and a rotational axis 308 of the motor, are provided for reference. The side shaft may enable rotational energy transfer to the gear 300 in the first axle differential 204 from the IAD gearing. Thus, the side shaft may function as an output shaft. This motor arrangement may increase IAD space efficiency. However, other motor positions may be used, in other examples.

FIG. 3 shows cutting planes 4A, 4B that correspond to the cross-sectional views illustrated in FIGS. 4A and 4B. FIG. 3 additionally, shows cutting plane 9, 11, 12 that correspond to the cross-sectional views illustrated in FIGS. 9, 11, and 12, respectively.

FIGS. 4A and 4B show different cross-sectional views of the IAD 202 associatively arranged in relation to one another for structural context. Specifically, FIG. 4A shows a cross-section of the electric motor 220 and a planetary gearset 400 included in the actuation assembly 218. The motor 220 and the planetary gearset 400 may be coaxial. Further, the rotational axis 308 of the motor 220 and the planetary gearset 400 may be parallel to and positioned vertically above an input shaft 402, shown in FIG. 4B. In this way, the actuation assembly may be spaced efficiently packaged in the IAD. However, other relative positions of the motor and planetary gearset may be used.

Continuing with FIG. 4A, the planetary gearset 400 may be a self-locking planetary gearset that is designed to be non-backdrivable. As described herein, non-backdrivability denotes that power applied to the gearset's output from downstream components (e.g., the ball ramp actuator and locking clutch) may not travel through the gearset back to its input. Conversely, the sun gear may be rotated in opposing directions which drive rotation of the planetary assembly's output (e.g., the second ring gear). Thus, the gearset may hold loads from downstream component such as loads experienced during clutch engagement. This load holding feature, allows motor hold torque during clutch engagement to be avoided, if desired. As indicated above, the planetary gearset 400 may provide rotational input to a ball ramp actuator 404, which is depicted in FIG. 4B.

FIG. 4B further shows a friction clutch 406 and the ball ramp actuator 404 in the actuation assembly 218 of the IAD 202. The friction clutch 406 may include a clutch pack 408 with different sets of plates that frictionally engage and disengage one another. Each set of plates may include a plurality of plates.

The ball ramp actuator 404 may include plates 410, 412 with ramps that have balls 414 positioned therebetween. Rotation of one of the plate 412 in opposing rotational directions may axially extend and retract the plate. In this way, rotational motion may be transformed into linear translational motion. The plate 412 may receive rotational input from the planetary gearset 400 (e.g., a ring gear in the planetary arrangement), shown in FIG. 4A.

A bearing 416 (e.g., thrust bearing) may be coupled to the input shaft 402 and the ball ramp actuator 404 and constrain rotation of these components. As described herein, a bearing may include roller elements and races that allow the bearing to constrain rotation of the component(s) to which it is attached. A helical gear 418, spider 422 (e.g., spider body), and pinon gears 424 (e.g., spider gears) on the spider are further illustrated in FIG. 4B. The spider 422 is rotationally coupled to the input shaft 402.

The helical gear 418 may include teeth 423 on an outer surface that are designed to mesh with teeth on the side shaft that comprises a pinion gear coupled to the input gear in the first axle differential. As described herein gears which transfer power therebetween includes meshing teeth that facilitate rotational energy transfer between the corresponding gears. The helical gear may further include teeth 426 that function as a side gear and mesh with the pinion gears 424. In the IAD, another side gear 428 may mesh with the pinion gears 424.

The clutch 406 may rotationally connect and disconnect the helical gear 418 to the input shaft 402. In this way, the IAD may be locked an unlocked. Specifically, when the clutch 406 is disengaged, a portion of the IAD power path may travel from the input shaft 402 to the spider 422, from the spider to the pinion gears 424, from the pinions to the helical gear 418 via the side gear teeth 426, and from the helical gear to the first axle differential by way of the side shaft (e.g., offset shaft) and gear arrangement. Further, in the clutch's disengaged configuration, a portion of the power path travels from the pinion gears 424 to the side gear 428, and from the side gear to the output shaft 302, shown in FIG. 3. In this way, the IAD is designed to permit speed differentiation between the drive axle outputs while power is divided between the drive axles.

Conversely, while the clutch is engaged, a portion of the IAD power path may travel from the input shaft 402 to the helical gear 418, and from the helical gear to the first axle differential via the offset shaft arrangement. Further while the clutch is engaged, the spider 422 and side gear 428, correspondingly, rotate in unison with the helical gear 418. This prevents speed differentiation between the drives axles to provide a fixed power split. In this way, the IAD may be locked and unlocked to modulate vehicle traction, thereby enhancing vehicle handling in a variety of operating environments.

Another bearing 430 is coupled to the side gear 428. Further, it will be understood that the side gear 428 may be rotationally attached to the output shaft 302, shown in FIG. 3. The output shaft 302 may be coupled to the second axle differential 206, depicted in FIG. 2. The housing sections 214, 216 that at least partially enclose the actuation assembly and friction clutch are further depicted in FIG. 4B. The housing sections 214, 216 may be configured to retain a lubricant therein which is delivered from lubrication passages, described in greater detail herein with regard to FIGS. 9-12.

FIGS. 5 and 6 show cross-sectional views of the electric motor 220 and planetary gearset 400 in the actuation assembly 218 of the IAD. The motor 220 shown in FIGS. 5 and 6 is positioned in a different location than the previous figures. The motor's location may be selected based on packaging constraints, motor size, and/or other end-use design parameters.

The planetary gearset 400 may be a two-stage planetary gearset. The ratio of the planetary gearset may be selected to provide a desired degree of torque multiplication for friction clutch actuation. Expected loading of the IAD may be taken into account when selecting the planetary gearset's ratio.

An output shaft 500 of the motor 220 may be rotationally coupled (e.g., directly coupled) to a sun gear 502 in the planetary gearset 400. The sun gear 502 therefore may serve as an input of the planetary assembly. A first ring gear 504 and a second ring gear 506 are further shown in FIGS. 5-6. The first and second ring gears 504, 506 include teeth on an inner surface that mesh with gear teeth in a first and second set of planet gears 508, 510, respectively.

The sets of planet gears 508, 510 may not be equivalent in size, in one example. For instance, the planet gears 508 may be smaller than the planet gears 510 or vice versa. In other examples, the sets of planet gears may be equivalently sized. The size of the gears in the planetary gearset may be selected to achieve a desired ratio that allows for efficient friction clutch actuation. The second ring gear 506 may further include teeth 512 on an outer surface. Further, the teeth 512 may mesh with teeth 513 in the plate 412 of the ball ramp actuator. In this way, the second ring gear may serve as the output of the planetary gearset. However, other planetary gearset constructions may be used, in alternate examples. The first ring gear 504 may be held stationary with regard to a housing 514 while the second ring gear 506 is allowed to rotate and drive the ball ramp actuator 404, shown in FIG. 4B.

The planet gears 508, 510 may reside on a carrier 516 that rotates in relation to the housing 514 during clutch actuation. However, planetary layouts with a distinct carrier for each set of planet gears may be used, in other examples. A planetary carrier covers 518, 520 may be coupled to the carrier 516. In turn, bearings 522, 524 may be coupled to the covers 518, 520. The bearings 522, 524 and cylindrical sections of the carrier covers 518, 520 reside in recesses in the housing 514. The housing 514 further includes an opening 526 that allows the plate 412 of the ball ramp actuator to extend therethrough and mesh with the second ring gear 506.

FIG. 7 shows an exploded view of the actuation assembly 218 and a section 700 of the IAD including the friction clutch 406, among other components. The input yoke 222 is again shown. A nut lock 702 designed to attach the input shaft 402 to the yoke may be further provided in the IAD. A slinger 704, seal 706, and/or bearing adjuster 708 may be further included in the IAD. These components may protect the bearing 416 from contamination as well as provide bearing preload adjustment.

Further in FIG. 7, the actuation assembly motor 220 with its output shaft 500 is again shown. A planetary cover 712 may be included in the actuation assembly to prevent debris from contaminating the planetary assembly.

The planetary gearset 400 may be a two-stage arrangement, as previously indicated. In the two-stage gearset embodiment, the gearset may include the first ring gear 504, the second ring gear 506, the sun gear 502, the first set of planet gears 508 on the carrier 516 (e.g., the carrier shafts), the second set of planet gears 510 on the carrier. The second ring gear 506 may include teeth 512 on an outer surface that functions as the planetary assembly's output, as previously discussed. This output may be coupled to teeth 513 in the plate 412 of the ball ramp actuator 404. Conversely, the sun gear 502 may function as the planetary gearset's input. The planetary gearset 400 may further include bearings 714, 716, 718 (e.g., needle roller bearings). The cover 518 (e.g., carrier holding cover) and the cover 520 (e.g., carrier locking cover) that may be included in the planetary gearset are again illustrated.

FIG. 7 further depicts the housing section 216 that may include a portion 719 that at least partially encloses the planetary arrangement, when assembled. The housing may further include a portion 721 that at least partially encloses the ball ramp actuator 404 and the friction clutch 406, when assembled. The housing portion 719 may be axially offset from the rotational axis 304 of the input shaft 402. Specifically, the planetary arrangement may be axially offset and positioned vertically above the ball ramp and friction clutch for more efficient component packaging. Further, positioning the planetary assembly and the electric motor above the other portions of the IAD may make them less susceptible to degradation from road debris, for instance.

As previously discussed, the planetary gearset 400 may be non-backdrivable. Thus, when torque is applied to the second planetary gear from friction clutch via the ball ramp actuator, the torque may not be transferred to the planetary gearset's input (e.g., the sun gear). Thus, the planetary assembly may be solely drivable from the sun gear. In one specific example, the planetary assembly may be a wolfram type planetary gearset. In this way, the planetary gearset may hold the load from the clutch during engagement. This allows the motor to be de-energized after the clutch transitions into its engaged position and avoids motor degradation that may be caused by torque spikes during clutch engagement. Consequently, energy may be conserved in the actuation system when compared to systems that rely on the motor torque to sustain clutch engagement.

The bearing 416 may be coupled to the input shaft 402 and therefore may be referred to as an input bearing. Further, the ball ramp actuator 404 may further include the plate 410. The plates in the actuator include ramped surfaces that interact with balls to axial extend and retract the actuator. The plate extension and retraction, frictionally engages and disengages plates in the clutch pack 408 of the friction clutch 406. Another bearing 722 (e.g., needle roller bearing), a bearing 723 (e.g., needle roller bearing), a retaining spring 724, a bearing 726 (e.g., a thrust needle roller bearing), a spring 728 (e.g., wave washer), a bearing 730 (e.g., needle roller bearing), and a spring 732 (e.g., wave spring) may be included in the IAD. These components may function to constrain rotation of components in the friction clutch and allow the ball ramp to retract. However, one or more of the springs and bearings may be omitted from the IAD, in other examples. The friction clutch 406 may include a clutch plate 734, clutch discs 736, 738, and outer clutch ring 740. The clutch discs 736, 738 may be sets of clutch discs that frictionally engage and disengage one another during clutch operation. Further, the helical gear 418 may be coupled to the outer clutch ring 740 to enable the clutch to permit power transfer to the helical gear when in an engaged configuration.

The spider 422 with the pinion gears 424 is again shown along with the side gear 428. Clips and/or other suitable mechanical attachment may be used to retain the pinion gears on the spider while allowing the pinions to rotate on the spider shafts during certain conditions. A cover 742 that partially encloses the spider 422 may be further included in the IAD along with a spacer 744 for bearing preload. The spider may rotate in tandem with the input shaft 402. While the IAD is unlocked, as the spider rotates, the pinions rotate thereon and drive the side gear 428 to enable speed differentiation between the outputs that deliver power to the axle differentials.

FIG. 8 shows another cross-sectional view of the IAD 202. The input yoke 222, input shaft 402, friction clutch 406, helical gear 418, side gear 428, and pinion gears 424 are again illustrated. FIG. 8 further depicts a first output shaft 302. Bearings such as needle bearings may be positioned between the side gear 428 and the input shaft 402 to enable independent rotation therebetween. The first output shaft 302 may be coupled to the side gear 428 via a splined interface 801 and/or other suitable mechanical attachment technique. Additionally, the output shaft 302 may be rotationally coupled to the second axle differential 206 shown in FIG. 2 by way of the shafts 210 and joints 212, for instances. An output interface 802 (e.g., yoke, joint, gear, combinations thereof, etc.) on the output shaft 302 may provide mechanical attachment to the downstream components. Bearings 804 facilitate rotation of the output shaft 302.

Figure 9:
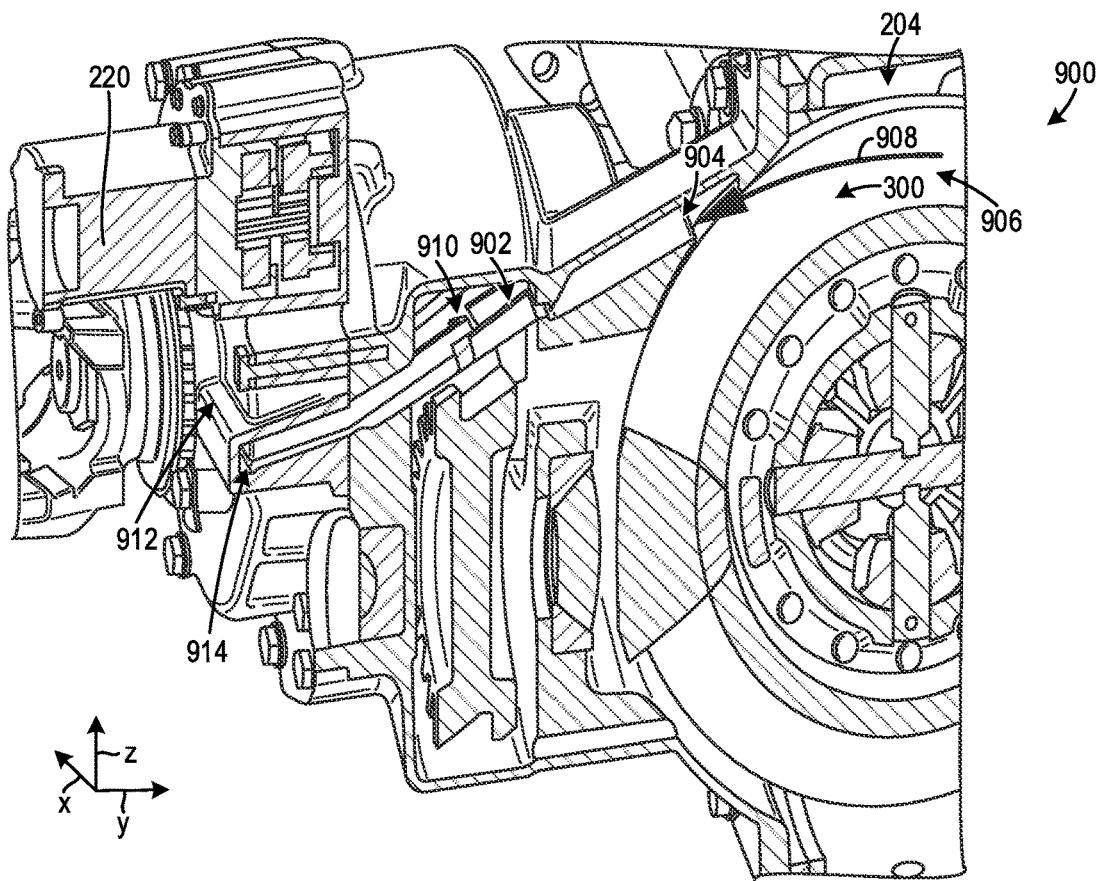
FIG. 9 shows a cross-sectional view of a supply lubrication passage in a lubrication system of the IAD, depicted in FIG. 2.

FIG. 9 illustrates a cross-sectional view of a lubrication system 900. The lubrication system 900 may include a supply lubrication passage 902. The passage 902 has an inlet 904. Specifically, in one example, the inlet 904 may receive a lubricant from an enclosure 906 in the first axle differential 204. To elaborate, the gear 300 (e.g., bevel gear) may supply splash lubricant to the inlet 904. This lubricant flow is indicated via arrow 908. The gear's splash lubrication may further be directed to side gears, spider gears, etc., in the first axle differential. In this way, the splash lubrication may serve a dual-use (differential lubrication and the supply of lubricant to the passage 902). Consequently, the axle differential components and the IAD components can be efficiently lubricated using a compact arrangement.

The supply lubrication passage 902 may be angled downward in relation to the gravitational axis. For instance, the slope of the passage may be greater than or equal to 5 degrees as measured from a horizontal axis. In this way, the lubricant flow may be gravity driven. As such, a pump may not be used to flow lubricant through the passage, thereby decreasing system complexity. However, in other examples, the lubrication system may use a pump which may decrease system efficiency.

Figure 10:
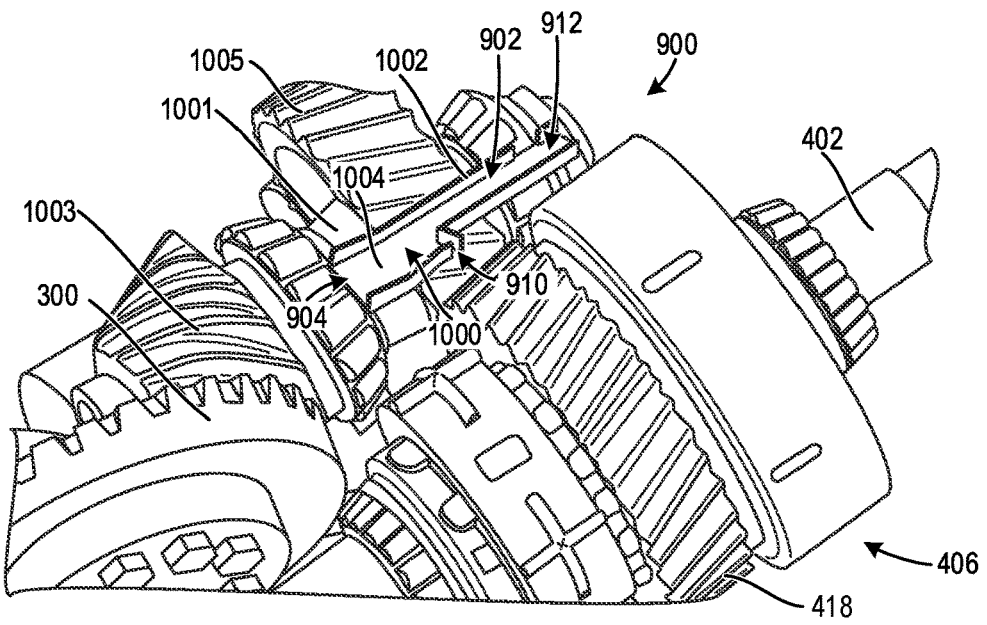
FIG. 10 shows a detailed view of the supply lubrication passage, depicted in FIG. 9.

The supply lubrication passage 902 may further include a first outlet 910 and/or a second outlet 912 shown in greater detail in FIG. 10, in one example. The first outlet 910 may supply lubricant to the helical gear 418, shown in FIG. 8. Further, the first outlet may laterally extend away from the body of the passage to flow lubricant to a desired helical gear location. The second outlet 912 may supply lubricant to the input bearing 416, shown in FIG. 8. In this way, component wear in the actuation assembly may be reduced, thereby extending the assembly's lifespan.

Continuing with FIG. 9, the supply lubrication passage 902 may be positioned vertically below the electric motor 220 but vertically above the side shaft 1001, shown in FIG. 11, for compact lubricant routing. However, other lubricant passage contours have been envisioned.

The supply lubricant passage 902 includes a section 914 that laterally extends toward the bearing 416, shown in FIG. 8. This section may be a rib which structurally reinforces the IAD housing. In this way, the lubricant may be efficiently routed through the housing without unduly impacting housing strength.

FIG. 10 includes a detailed illustration of the lubrication passage 902 in the lubrication system 900 with the surrounding IAD housing omitted to reveal the passage's contours. The passage 902 may include a manifold 1000 which distributes lubricant to the first outlet 910 and the second outlet 912. The first outlet 910 is shown adjacent to the helical gear 418, which facilitates lubrication thereof. The inlet 904 of the passage 902 which receives splash lubricant from the gear 300 is again illustrated in FIG. 10. The gear 300 is shown meshing with a gear 1003 on the side shaft 1001. In this way, the first axle differential may receive power from the IAD during drivetrain operation. Thus, the side shaft 1001 may function as an output shaft of the IAD. A gear 1005 that meshes with the helical gear 418 is further illustrated in FIG. 10 along with the friction clutch.

The lubrication passage 902 may be positioned laterally between the side shaft 1001 and the input shaft 402. In this way, the passage may be space efficiently routed through the IAD's outer housing. The lubrication passage 902 may further be located above the side shaft 1001 and the input shaft 402 to allow the flow through the passage to be gravity driven, in one example.

The lubrication passage 902 may include planar sidewalls 1002 and a base surface 1004. This arrangement may enable the lubricant to be more efficiently collected at the passages inlet. However, other contours have been envisioned. The lubrication passage 902 may decrease in cross-sectional area from the inlet 904 to the second outlet 912. In this way, the size of the lubricant passages may be tailored to achieve a desired amount of lubricant flow without unduly impacting the housing's structural integrity.

Figure 11:
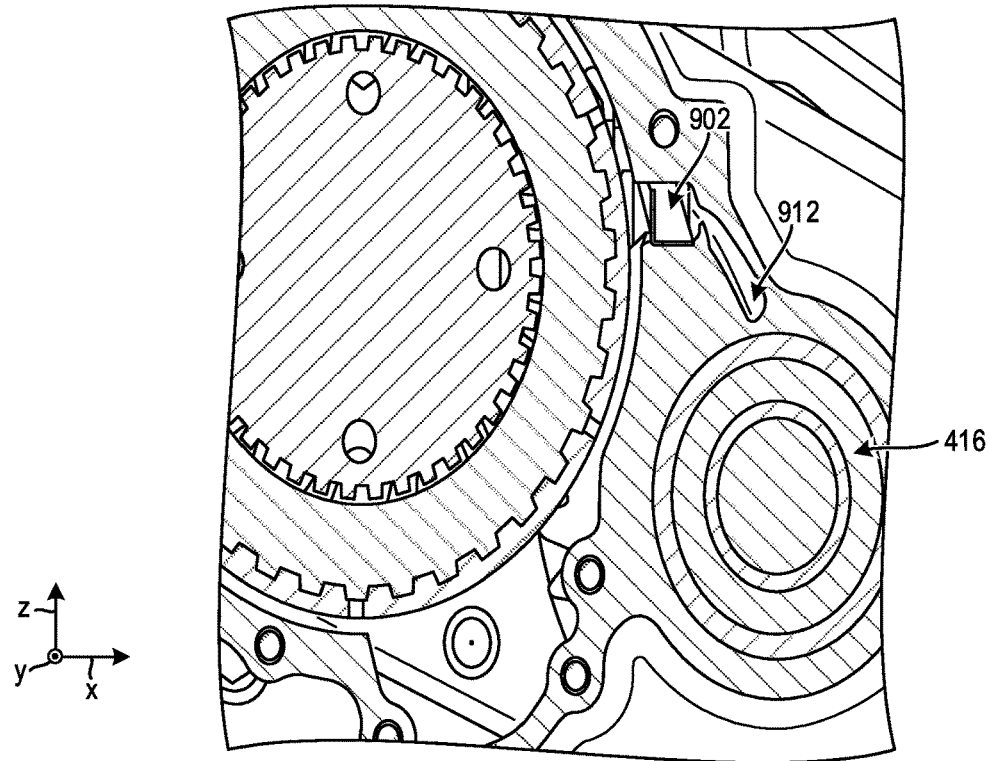
FIG. 11 shows another cross-sectional view of the supply lubrication passage, depicted in FIG. 9.
Figure 12:
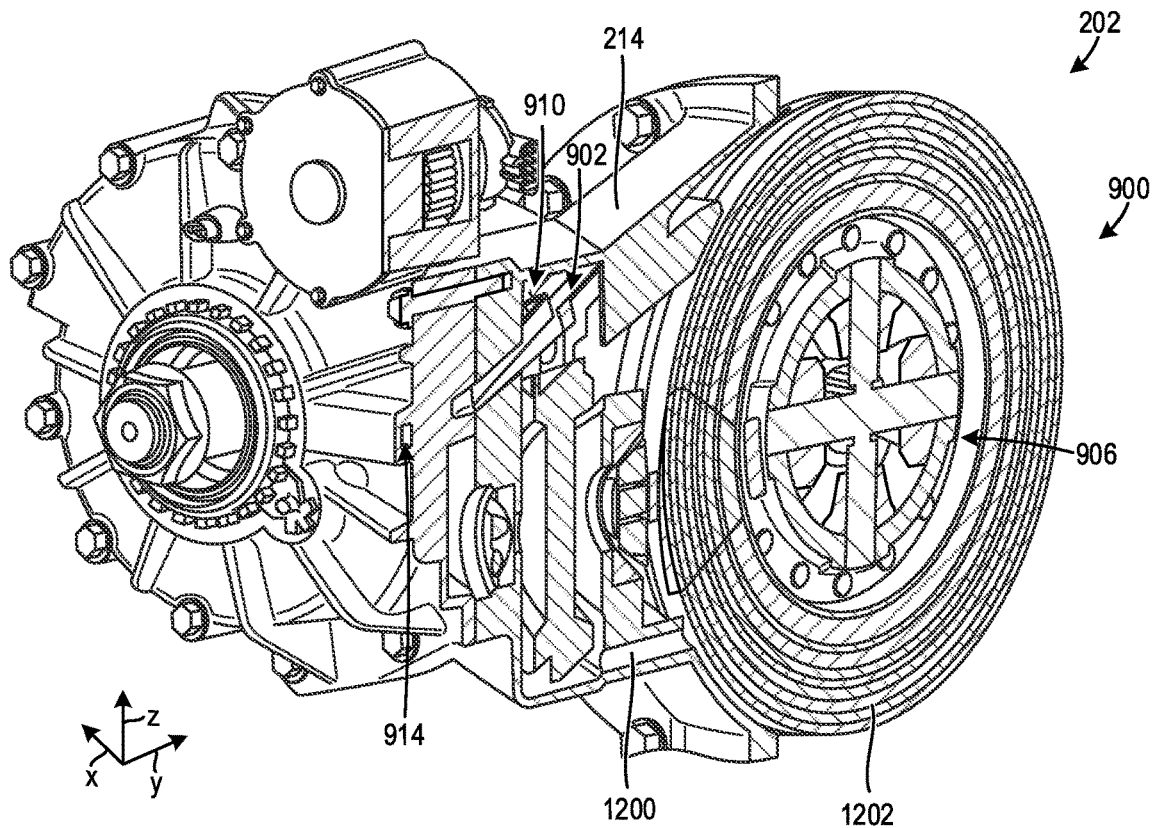
FIG. 12 shows a cross-sectional view of the supply lubrication passage and a return lubrication passage in the IAD lubrication system.

FIG. 11 shows a detailed view of the supply lubrication passage 902 and specifically the second outlet 912. As shown, the outlet 912 opens into the input bearing 416. However, in other examples, the outlet 912 may open in a region that is adjacent to the clutch pack. Further, the input bearing 416 may be contoured to direct the lubricant to plates in the adjacent clutch pack. For instance, the bearing may include lubricant outlets that are axially aligned that open adjacent to the clutch pack.

FIG. 12 again shows the lubrication system 900 with the supply lubrication passage 902 in the IAD 202. The supply lubrication passage 902 is again shown extending through the housing 214. The lubrication system 900 may further include a return lubrication passage 1200. The return lubrication passage 1200 is positioned vertically below the supply lubrication passage 902. Further, the lubrication passage 1200 flows lubricant back to a sump 1202 in the enclosure 906. From the sump, the lubricant is picked up via the gear 300, shown in FIG. 10, which initiates the splash lubrication. The return passage 1200 therefore allows for efficient circulation of the lubricant in the IAD. The flow of lubricant through the return lubrication passage may be gravity drive, in one example. Consequently, the system's energy efficiency may be increased when compared to systems using lubricant pumps to generate lubricant flow. The section 914 of the supply lubrication passage 910 that extends toward the input bearing is again shown in FIG. 12.

FIGS. 2-12 are draw approximately to scale, although other relative dimensions may be used, if desired.

FIGS. 1-12 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 13 shows a method 1300 for operation of an IAD in a drivetrain. The method 1300 may be implemented by the drivetrains and IADs described above with regard to FIGS. 1-12, in one example, or may be implemented by another suitable drivetrain and IAD, in another example. Furthermore, the method 1300 may be implemented by a controller including a processor and memory, as previously discussed.

At 1302, the method includes determining operating conditions. The operating conditions may include vehicle speed, axle differential speeds, ambient temperature, wheel speeds, vehicle traction, and the like. The operating conditions may be determined via sensor inputs, modeling, look-up tables, and/or other suitable techniques.

Next at 1304, the method includes determining whether or not to lock the IAD. This determination may be automatically carried out without an operator request to lock the IAD, in one example. Operating conditions that may be taken into account when determining the IAD's locking state may include vehicle speed and the speeds of both the first and second drive axle differentials. For instance, when the vehicle speed is lower than a threshold value (e.g., 64 kilometers per hour (km/h), 70 km/h, or 80 km/h) and the difference between the axle differential speeds exceeds a threshold variance, it may be determined. The speed variance between the axle differential may be indicative of drive axle slip or anticipated drive axle slip. In other examples, the IAD may be locked based on one or more vehicle traction conditions. These traction conditions may include operating conditions such as wheel slip, ambient temperature, engine speed, driver requested torque (e.g., accelerator pedal position), and the like. In this way, the IAD lock command may be generated to increase vehicle traction.

If an IAD lock command has not been generated (NO at 1304) the method moves to 1306. At 1306, the method includes continuing current IAD control strategy. As such, step 1306 may include sustaining the IAD in an unlocked configuration.

On the other hand, if an IAD lock command has been generated (YES at 1304) the method moves to 1308. At 1308, the method includes energizing the motor and sustaining energization until the clutch pack inhibits speed differentiation between the axle differentials.

Next at 1310, the method includes de-energize the motor while IAD locking is sustained. To elaborate, the motor may be de-energized once the plates in the clutch frictionally engage and locking is achieved. In this way, the actuation assembly may efficiently sustain clutch engagement. The use of the non-backdrivable planetary gearset allows for this motor de-energization.

An IAD unlocking method may further be implemented, in some scenarios. The IAD unlocking method may include determining if the IAD should be unlocked based on one or more vehicle traction conditions such as wheel slip, ambient temperature, engine speed, driver requested torque (e.g., accelerator pedal position). As such, the IAD may be unlocked when vehicle traction has surpassed a threshold value. Responsive to determining that the IAD should be unlocked, the motor may be energized to rotate the planetary gearset in rotational direction which disengages the friction clutch. Once the clutch is disengaged, the motor may again be de-energized to conserve energy.

Further in one example, a method for lubricating an IAD may be provided. The method may be used to lubricate the IADs described above with regard to FIGS. 1-12 or other suitable IADs. The method may include flowing lubricant through the supply lubrication passage to the first and second outlets from the inlet which receives splash lubricant from the axle differential's input gear. The first outlet directs the lubricant to the helical gear and the second outlet directs lubricant to the input bearing. In this way, the IAD locking assembly may be efficiently lubricated to increase IAD longevity and decrease the likelihood of component degradation in the IAD. The method may further include flowing the lubricant from the input bearing to plates in the adjacent clutch pack to again decrease clutch wear. The method may further include flowing lubricant back to the axle differential enclosure through a return passage. This lubrication flow may be passively driven via gravity and therefore enables lubrication to be carried out without energy consuming components such as lubricant pumps, if desired.

FIG. 14 shows a timing diagram where a use-case control strategy is graphically depicted. The control strategy may be carried out by the drivetrain systems and IADs discussed above with regard to FIGS. 1-12, in one example. Alternatively, in other examples, the control strategy may be implemented by other suitable drivetrains and IADs. In each graph of the timing diagram, time is indicated on the abscissa. Although specific numerical values are not indicated on the abscissa, sequential points of interest are designated and time increases from left to right. The ordinates for plot 1402 indicates the IAD lock command (a lock or unlock command) present in the control system. The ordinate for plot 1404 indicates voltage delivered to the electric motor, in the IAD's actuation assembly. The voltage plot is a high level representation of the voltage signal and the voltage delivered to the motor may be delivered via a duty cycle that is less than 100%, for instance.

At t1, an IAD lock instruction is generated. Responsive to generation of the lock command, voltage is delivered to the motor to rotate the motor in a first direction to initiate clutch actuation. Once the clutch is engaged and correspondingly inhibiting speed differentiation, the voltage delivered to the motor is discontinued at t2. Due to the non-backdrivability of the planetary assembly, the clutch remains engaged when motor torque is discontinued, thereby conserving energy.

At t3, the IAD is commanded to unlock. Responsive to generation of the unlock command, the voltage is again delivered to the motor to rotate the motor in a second direction to initiate clutch disengagement. At t4, the motor is de-energized once the IAD unlocks. In this way, the motor may be actively controlled to unlock the clutch. The non-backdrivability of the planetary assembly demands active control of the motor for unlocking the clutch.

The technical effect of the drivetrain with the IAD and the method for operating and lubricating the IAD is to increase vehicle traction, increase IAD efficiency, increase IAD packaging efficiency, and increase IAD longevity.

The invention will be further described in the following paragraphs. In one aspect, a drivetrain system is provided that comprises an interaxle differential (IAD) configured to receive power from a prime mover; a motor configured to drive a planetary gearset; and a ball ramp actuator configured to selectively engage a plurality of plates in a clutch pack of a friction clutch in response to receiving rotational input from the planetary gearset; wherein, in an engaged configuration, the friction clutch prevents speed differentiation between a first IAD output and a second IAD output; and wherein the first IAD output is coupled to a first axle differential and the second IAD output is coupled to a second axle differential.

In another aspect, a method for operation of a drivetrain system is provided that comprises automatically locking an interaxle differential (IAD) based on a speed variance between a first axle differential and a second axle differential; wherein the IAD comprises: a motor driving a self-locking planetary gearset; and a ball ramp actuator selectively engaging a plurality of plates in a clutch pack of a friction clutch in response to receiving rotational input from the self-locking planetary gearset; wherein, in an engaged configuration, the friction clutch prevents speed differentiation between a first output shaft and a second output shaft; and wherein the first output shaft is coupled to the first axle differential and the second output shaft is coupled to the second axle differential.

In yet another aspect, an interaxle differential (IAD) is provided that comprises an electric motor rotationally coupled to a sun gear in a self-locking planetary gearset; and a ball ramp actuator configured to selectively engage a plurality of plates in a clutch pack of a friction clutch in response to receiving rotational input from a ring gear in the self-locking planetary gearset; wherein the ring gear meshes with teeth in the ball ramp actuator; wherein, in an engaged configuration, the friction clutch prevents speed differentiation between a first output shaft and a second output shaft; and wherein the first output shaft is rotationally coupled to a first axle differential and the second output shaft is rotationally coupled to a second axle differential.

In yet another aspect, an interaxle differential (IAD) is provided that comprises a locking assembly including a friction clutch, wherein the friction clutch includes a clutch pack that comprises a plurality of plates configured to engage and disengage to inhibit and permit speed differentiation between a first axle differential and a second axle differential; wherein the first axle differential includes an input gear; and a supply lubrication passage including: an inlet that receives a lubricant from an enclosure surrounding the input gear; and a first outlet flowing the lubricant to a gear coupled to the clutch pack.

In another aspect, a method for lubricating an interaxle differential (IAD) is provided that comprises flowing a lubricant through a supply lubrication passage that receives, at an inlet, splash lubricant from an input gear in a first axle differential; and flowing the lubricant through a first outlet of the supply lubrication passage to a gear coupled to a clutch pack; and flowing the lubricant through a second outlet of the supply lubrication passage to an input bearing coupled to a shaft that extends from an input interface of the IAD.

In another aspect, an interaxle differential (IAD) is provided that comprises a supply lubrication passage traversing a housing, wherein the supply lubrication passage includes: an inlet that receives splash lubricant from an input gear that is positioned in an enclosure of a first axle differential; a first outlet supplying the lubricant to a gear coupled to a clutch pack in a friction clutch; and a second outlet supplying the lubricant to an input bearing and wherein the input bearing is coupled to an input shaft that extends from an input interface; wherein the clutch pack is actuated by a ball ramp actuator that is coupled to a self-locking planetary gear assembly; and wherein the friction clutch prevents and permits speed differentiation between the first axle differential and a second axle differential.

In any of the aspects or combinations of the aspects, the planetary gearset may be non-backdrivable.

In any of the aspects or combinations of the aspects, the planetary gearset may include a sun gear coupled directly to the motor.

In any of the aspects or combinations of the aspects, the planetary gearset may include a ring gear with teeth on an outer surface that mesh with teeth in the ball ramp actuator.

In any of the aspects or combinations of the aspects, the drivetrain system may further comprise a controller including instructions stored in non-transitory memory that when executed by a processor, during a first operating condition, cause the controller to: automatically energize the motor and rotate the planetary gearset in a first rotational direction, wherein rotating the planetary gearset in the first rotational direction frictionally engages the plurality of plates in the clutch pack; and de-energize the motor after the plurality of plates frictionally engage and lock the clutch pack.

In any of the aspects or combinations of the aspects, the controller may include instructions stored in the non-transitory memory that when executed by the processor, during a second operating condition, cause the controller to: automatically energize the motor and rotate the planetary gearset in a second rotational direction, wherein rotating the planetary gearset in the second rotational direction frictionally disengages the plurality of plates in the clutch pack; and de-energize the motor after the plurality of plates frictionally disengage and unlock the clutch pack.

In any of the aspects or combinations of the aspects, the first operating condition may be a condition when a speed variance between the first and the second axle differentials exceeds a threshold value and the second operating condition is a condition where the speed variance is less than the threshold value.

In any of the aspects or combinations of the aspects, the planetary gearset may be a two-stage planetary gearset.

In any of the aspects or combinations of the aspects, the first and second axle differentials may be included in a tandem axle.

In any of the aspects or combinations of the aspects, the first and second axle differentials may be non-steerable.

In any of the aspects or combinations of the aspects, automatically locking the IAD may include rotating the self-locking planetary gearset in a first rotational direction through energization of the motor until the plurality of plates are frictionally engaged and speed differentiation between the first and second output shaft is prevented; and after frictional engagement of the plurality of plates, de-energizing the motor.

In any of the aspects or combinations of the aspects, the method may further comprise automatically unlocking the IAD based on a vehicle traction condition.

In any of the aspects or combinations of the aspects, automatically unlocking the IAD may include rotating the self-locking planetary gearset in a second rotational direction through energization of the motor until the plurality of plates are frictionally disengaged; and after frictional disengagement of the plurality of plates, de-energizing the motor.

In any of the aspects or combinations of the aspects, the self-locking planetary gearset may be a non-backdrivable planetary gearset.

In any of the aspects or combinations of the aspects, the IAD may further comprise a controller including instructions stored in non-transitory memory that when executed by a processor, during a first operating condition, cause the controller to: de-energize the motor after the plurality of plates become frictionally engaged in a clutch locking sequence.

In any of the aspects or combinations of the aspects, the clutch locking sequence may be automatically implemented without operator input.

In any of the aspects or combinations of the aspects, the IAD may further comprise a controller including instructions stored in non-transitory memory that when executed by a processor, during a first operating condition, cause the controller to: energize the electric motor to rotate the electric motor in a direction that frictionally disengages the plurality of plates in the friction clutch.

In any of the aspects or combinations of the aspects, the self-locking planetary gearset may be a two-stage wolfram planetary gearset.

In any of the aspects or combinations of the aspects, the supply lubrication passage may include a second outlet that flows the lubricant to an input bearing and wherein the input bearing is coupled to an input shaft that extends from an input interface of the IAD.

In any of the aspects or combinations of the aspects, the input bearing may be designed to flow the lubricant to the clutch pack.

In any of the aspects or combinations of the aspects, the first outlet may be positioned upstream of the second outlet in the supply lubrication passage.

In any of the aspects or combinations of the aspects, the input gear may generate splash lubrication that is directed to a plurality of gears in the first axle differential and received by the inlet of the supply lubrication passage.

In any of the aspects or combinations of the aspects, the supply lubrication passage may be vertically sloped.

In any of the aspects or combinations of the aspects, the enclosure may include a lubricant reservoir.

In any of the aspects or combinations of the aspects, the IAD may further comprise a return lubrication passage extending between a housing of the IAD and the enclosure.

In any of the aspects or combinations of the aspects, the IAD may further comprise an electric motor rotationally coupled to a planetary gearset, and a ball ramp actuator receiving rotational input from the planetary gearset and actuating the clutch pack.

In any of the aspects or combinations of the aspects, the planetary gearset may be non-backdrivable.

In any of the aspects or combinations of the aspects, the method may further comprise flowing the lubricant through the input bearing to a plurality of plates in the clutch pack.

In any of the aspects or combinations of the aspects, the lubricant flow may not be generated by a pump.

In any of the aspects or combinations of the aspects, the first outlet may be positioned upstream of the second outlet.

In any of the aspects or combinations of the aspects, the gear may be a helical gear that is rotationally coupled to a set of plates in the clutch pack.

In any of the aspects or combinations of the aspects, the IAD may further comprise a return lubrication passage extending through a housing of the IAD back to the enclosure.

In any of the aspects or combinations of the aspects, the supply and return lubrication passages may be gravity driven.

In any of the aspects or combinations of the aspects, the input bearing may be coupled to an input yoke that is configured to receive rotational energy from a prime mover and wherein the first and the second outlets are positioned vertically below the self-locking planetary gear assembly.

In any of the aspects or combinations of the aspects, the supply lubrication passage may be positioned laterally between an input shaft and an outlet shaft of the IAD.

In another representation, a power divider in a vehicle drivetrain is provided. The power divider is designed to automatically prevent output speed differentiation via a wet friction clutch based on vehicle operating conditions. The power divider includes an electric motor, a self-locking planetary gearset, and a ball ramp actuator cooperatively functioning to lock and unlock the wet friction clutch.

In yet another representation, a lubrication system in a power divider is provided. The lubrication system passive routes splash lubricant from an axle differential to a helical gear, friction clutch, and input shaft bearing via a sloped passage that traverses a housing of the power divider. The sloped passage includes a section that radially extends towards the input shaft bearing from manifold.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other system hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the control system, where the described actions are carried out by executing the instructions in a system including the various hardware components in combination with the electronic controller.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The invention claimed is:

1. An interaxle differential (IAD) system, comprising:
   an IAD configured to couple to a prime mover and including a first output that is configured to couple to a first axle and a second output that is configured to couple to a second axle;
   an electric motor coupled to a self-locking planetary gearset;
   an actuator coupled to the self-locking planetary gearset; and
   a friction clutch that is coupled to the actuator and selectively locks the IAD;
   wherein in the locked configuration the friction clutch inhibits speed differentiation between the first output and the second output;
   wherein in an unlocked configuration the friction clutch permits speed differentiation between the first output and the second output; and
   wherein the first axle and the second axle are included in a tandem axle.

2. The IAD system of claim 1, wherein the self-locking planetary gearset is a multi-stage gearset.

3. The IAD system of claim 1, wherein the planetary gearset includes a first gear coupled directly to the electric motor.

4. The IAD system of claim 3, wherein the planetary gearset includes a second gear with teeth on an outer surface that mesh with teeth in the actuator.

5. The IAD system of claim 4, wherein the first gear is a sun gear and the second gear is a ring gear.

6. The IAD system of claim 1, further comprising a controller including instructions that when executed by a processor, during a first operating condition, cause the controller to:
   energize the electric motor and rotate the planetary gearset in a first rotational direction, wherein rotating the planetary gearset in the first rotational direction locks the friction clutch; and
   de-energize the electric motor after the friction clutch is locked.

7. The IAD system of claim 6, wherein the controller includes instructions that when executed by the processor, during a second operating condition, cause the controller to:
   energize the electric motor and rotate the planetary gearset in a second rotational direction, wherein rotating the planetary gearset in the second rotational direction unlocks the friction clutch; and
   de-energize the electric motor after the friction clutch is disengaged.

8. The IAD system of claim 7, wherein the steps of energizing the electric motor are automatically implemented.

9. The IAD system of claim 1, wherein the prime mover is an internal combustion engine.

10. The IAD system of claim 1, wherein the prime mover is a traction motor.

11. The IAD system of claim 1, wherein the actuator is a ball ramp actuator.

12. The IAD system of claim 1, wherein the actuator, the electric motor, and the planetary gearset are positioned in a housing that encloses the friction clutch.

13. A power divider for a vehicle drivetrain, comprising:
   a friction clutch configured to automatically and selectively prevent speed differentiation between a first output and a second output; and
   an electric motor that drives a self-locking planetary gearset, and a ball ramp actuator cooperatively functioning to lock and unlock the friction clutch;
   wherein the first output is configured to couple to a first axle;
   wherein the second output is configured to couple to a second axle;
   wherein when the friction clutch is locked a speed variance between the first axle and the second axle is inhibited; and
   wherein the friction clutch is a wet friction clutch.

14. The power divider of claim 13, wherein the self-locking planetary gear set is a two-stage wolfram planetary gearset.

15. A method for operation of an inter-axle differential (IAD), comprising:
   locking a friction clutch in the IAD based on one or more vehicle operating conditions;
   wherein the IAD comprises:
     an electric motor driving a self-locking planetary gearset; and
     a ball ramp actuator that is coupled the friction clutch;
   wherein the IAD includes a first output and a second output that are configured to couple to a first axle and a second axle, respectively; and
   wherein the locking the friction clutch includes:
     energizing the electric motor until a plurality of plates frictionally engage to prevent speed differentiation between the first output and the second output; and
     de-energizing the electric motor after the plurality of plates are frictionally engaged.

16. The method of claim 15, wherein locking the friction clutch includes automatically locking the friction clutch without operator input.

17. The method of claim 15, wherein locking the friction clutch includes energizing the electric motor until the friction clutch is in an engaged configuration and de-energizing the electric motor subsequent to the friction clutch achieving the engaged configuration.

18. The method of claim 15, wherein the one or more operating conditions include a vehicle traction condition and/or a speed variance between a first IAD output coupled to the first axle and a second IAD output coupled to the second axle.

* * * * *